Dec. 6, 1949 — H. J. BEACH — 2,490,195
V-BELT FASTENER
Filed Oct. 29, 1945

Inventor:
Hugh J. Beach
By: Joseph Harris
his Atty.

Patented Dec. 6, 1949

2,490,195

UNITED STATES PATENT OFFICE 2,490,195

V-BELT FASTENER

Hugh J. Beach, Glen Ellyn, Ill., assignor to Flexible Steel Lacing Company, Chicago, Ill., a corporation of Illinois Application October 29, 1945, Serial No. 625,396

1 Claim. (Cl. 24—33)

This invention relates to V belt fasteners and, more especially, V belt fasteners of the flexible or hinged type.

In the use of V or side driving belts, one of the great difficulties has been to provide a satisfactory type of hinge or pintle connection which will not only be prevented from working out of place endwise but which also will have long life. Because V belt fasteners are necessarily of relatively small size and, particularly, the hinge or pintle connector, it is impossible to utilize expedients such as may be used in the relatively larger fasteners for flat belts. Furthermore, because V belts run in grooves, any means for retaining the pintle connector in proper operating position must be confined to a space less than that between the side walls of the grooves.

Heretofore, hinge or pintle connectors for V belt fasteners have been either of the solid cylindrical type requiring some additional means to prevent endwise displacement or of the multiple piece type wherein the parts are so small that it is extremely difficult to properly assemble the parts. In neither of the general prior types indicated, has connector means of the fastener given satisfactory wear.

An object of the present invention, therefore, is to provide a flexible V belt fastener and, more specifically, a hinge or pintle connector which is of the utmost simplicity of construction and ease of assembling and wherein the connector is positively insured against endwise displacement in operation and which provides longer wearing qualities.

More specifically, an object of the invention is to provide, in a V belt fastener of the type having interdigitated loop attaching members, a hinge or pintle connector therefor which comprises a unitary, solid member having integral formations which prevent both accidental endwise displacement and rotation.

Other objects of the invention will more clearly appear from the description and claim hereinafter following.

Figure 1:
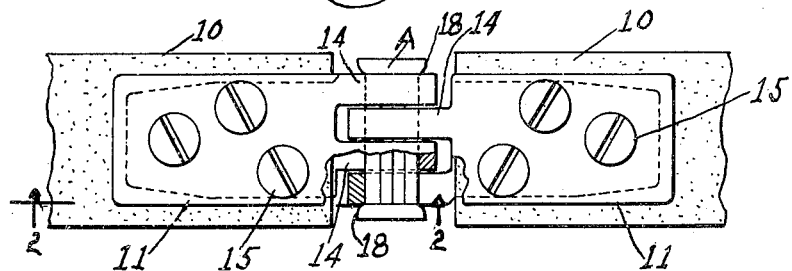
Figure 2:
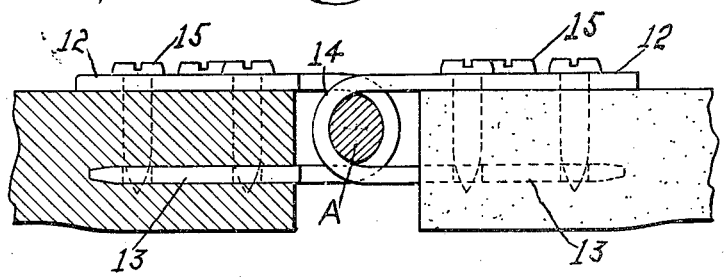
Figure 3:
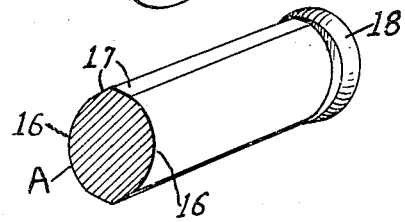
Figure 4:
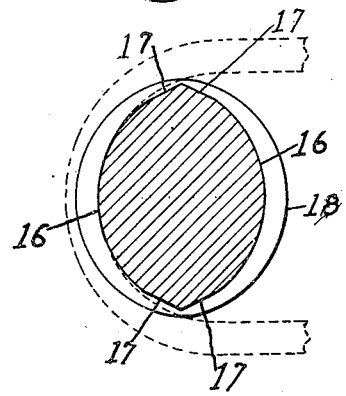

In the drawing forming a part of this specification, Fig. 1 is a top plan view of adjacent ends of a V belt showing the improved fastener applied thereto, parts being broken away to better illustrate details of construction. Fig. 2 is a part side elevation, part vertical longitudinal section on line 2—2 of Fig. 1 looking in the direction of the arrows. Fig. 3 is a perspective view of a portion of the improved hinge pin, the near end being in transverse section. And Fig. 4 is a transverse section, upon a larger scale, of the hinge pin, one of the attaching member loops being indicated in dotted lines to show its relation to the pin. In all views, the scale is considerably enlarged over the size of the actual construction in order to better illustrate the detailed formations.

In said drawing, 10—10 indicate the adjacent ends of a V belt. To each belt end is secured an attaching plate or member 11 each of which is of generally U-shape having an upper or outer arm 12, inner arm 13 inserted into the belt material, and two, laterally spaced, rounded loops 14—14. The loops 14 of the two attaching members are alternated or interdigitated when in operative position as clearly shown in Figs. 1 and 2 the rounded loops thereby providing a bearing space for the hinge pin, as evident the attaching members 11 are retained in place by suitable securing means such as the screws 15—15 entered through alined holes in the arms of said members, as shown.

The improved pintle or hinge pin is designated generally by the reference character A. As shown, the same comprises a unitary or single element of solid metal which, in cross section, has two partial cylindrical bearing surfaces 16—16, the centers of which are overlappingly offset beyond each other so that, as best shown in Figs. 2 and 4, the pin is of approximately oval cross section. As clearly shown in Fig. 1, the cylindrical bearing surfaces 16—16 extend substantially the entire length of the pin which occupies the entire length of said bearing space formed by the loops. The cross section of the pin thus is uniform throughout the entire length of the cooperating bearing surfaces of the pin and loops, thereby allowing of the necessary relative limited rotative movement of the loops and cylindrical surfaces while at the same time preventing rotation of the pin. Along the top and bottom, the pin A is formed with pairs of relatively narrow, longitudinally extending flat faces 17—17, each pair arranged at an obtuse angle to each other, as shown. At each end, the pin A is formed with a comparatively shallow cylindrical shoulder or collar 18 for the purpose hereinafter described.

To assemble the fastener after the attaching members have been secured to the respective belt ends, the loops 14 are cooperatively arranged as best shown in Fig. 1 and the belt ends brought closer together than shown in Figures 1 and 2, which is possible on account of the space between the respective outer ends of the loops and opposed belt ends, thus enlarging the space which receives the hinge pin. The latter may be then inserted endwise due to the ovate shape of the shoulder 18 and the belt ends drawn apart resulting in the operative condition shown in Figs. 1 and 2. As thus assembled and so long as the belt remains under tension, the pin cannot work out endwise because of the shoulders or collars 18 which engage with the outer edges of the outermost loops 14 as shown in Fig. 1. It will also be seen that, on account of the oval-like section of the pin, the latter is prevented from rotating, thus insuring more uniform wear and longer life of the pin.

Although the preferred form of the invention has been shown and described, the same is by way of illustration only. All changes and modifications are contemplated that come within the scope of the appended claim.

What is claimed is:

A disconnectable V-belt fastener of the class described comprising a pair of generally U-shaped attaching members disposed in opposed relation, and a hinge pin interconnecting said attaching members, each of said members comprising a pair of laterally spaced loops interdigitated to provide a continuous bearing surface for said hinge pin, said hinge pin comprising a shank having an ovate cross section of uniform dimension, said shank extending through said spaced loops, and a pair of shoulders which are integral with said shank and which are disposed at opposite ends thereof, said shoulders being closely adjacent said interdigitated loops when said attaching members are under tension and being ovate in cross section and having a maximum diametrical dimension not greater than the maximum diametrical dimension of said ovate cross-section of said shank.

HUGH J. BEACH.

REFERENCES CITED

The following references are of record in the file of this patent:

UNITED STATES PATENTS

| Number | Name | Date |
|---|---|---|
| 1,594,691 | Purple | Aug. 3, 1926 |
| 1,743,157 | Morse | Jan. 14, 1930 |
| 1,975,862 | Olsen | Oct. 9, 1934 |

FOREIGN PATENTS

| Number | Country | Date |
|---|---|---|
| 24,070 | Great Britain | 1904 |
| 15,842 | Great Britain | 1908 |
| 24,405 | Great Britain | 1910 |
| 10,454 | Great Britain | 1911 |
| 202,132 | Great Britain | Aug. 16, 1923 |